(12) United States Patent
Lu

(10) Patent No.: US 6,507,977 B2
(45) Date of Patent: Jan. 21, 2003

(54) COMPUTER HINGE

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 29 days.

(21) Appl. No.: 09/824,599

(22) Filed: Apr. 2, 2001

(65) Prior Publication Data
US 2002/0138946 A1 Oct. 3, 2002

(51) Int. Cl.[7] .......... E05C 17/64; E05D 11/08; E05D 11/00; G06F 1/16
(52) U.S. Cl. .............. 16/342; 16/273; 361/681
(58) Field of Search .......... 16/342, 337, 273, 16/274; 248/900; 361/680, 681, 682, 683, 684

(56) References Cited

U.S. PATENT DOCUMENTS

| 4,137,963 A | * | 2/1979 | Langer et al. | 164/442 |
| 5,632,066 A | * | 5/1997 | Huong | 16/338 |
| 5,713,672 A | * | 2/1998 | Lu | 384/289 |
| 5,771,540 A | * | 6/1998 | Carpenter et al. | 16/299 |
| 5,774,939 A | * | 7/1998 | Lu | 16/273 |
| 5,894,635 A | * | 4/1999 | Lu | 16/342 |
| 5,896,622 A | * | 4/1999 | Lu | 16/331 |
| 6,070,494 A | * | 6/2000 | Horng | 16/337 |
| 6,249,426 B1 | * | 6/2001 | O'Neal et al. | 16/334 |
| 6,286,187 B1 | * | 9/2001 | Chang | 16/340 |
| 6,317,927 B1 | * | 11/2001 | Lai et al. | 16/338 |
| 6,393,662 B1 | * | 5/2002 | Huang et al. | 16/273 |

* cited by examiner

Primary Examiner—Anthony Knight
Assistant Examiner—Vishal Patel
(74) Attorney, Agent, or Firm—Alan D. Kamrath; Rider, Bennett, Egan & Arundel

(57) ABSTRACT

A computer hinge has a sleeve and a shaft. The sleeve has a tubular portion with an inner surface, an outer surface, a slit peripherally defined through the tubular portion, grooves and a receiving recess defined in the inner surface of the tubular portion. The shaft has a journal with an outer surface integrally formed with the second connection plate and has at least one meander-line recess defined in the outer surface of the journal and a flange formed on the outer surface of the journal to correspond to the receiving recess in the tubular portion.

12 Claims, 5 Drawing Sheets

COMPUTER HINGE

BACKGROUND OF THE INVENTION

1. Field of the Invention

The present invention relates to a hinge, and more particularly to a hinge adapted to engage respectively with the mainframe and the monitor of the computer.

2. Description of Related Art

A computer hinge normally has a sleeve securely connected to the housing of the computer and a shaft securely connected to the monitor of the computer and pivotally attached to the sleeve. To enhance the pivotal movement between the sleeve and the shaft, multiple lubrication grooves or recesses are defined respectively in either the inner face of the sleeve or the shaft or the outer face of the shaft. When the lubricant is applied to the grooves or recesses and the shaft is inserted into the sleeve, the pivotal movement between the sleeve and the shaft is smoothed. Furthermore, after the shaft is inserted into the sleeve, a retaining device is necessary to secure the engagement between the shaft and the sleeve.

It has been found that neither the recesses in the sleeve nor the grooves in the shaft can provide sufficient lubrication for the pivotal movement between the shaft and the sleeve, especially after a long period of repeated use of the hinge. Further, the addition of the retaining device to the hinge will increase the manufacturing cost.

To overcome the shortcomings, the present invention tends to provide an improved computer hinge to mitigate and obviate the aforementioned problems.

SUMMARY OF THE INVENTION

The primary objective of the invention is to provide a hinge that operates smoothly. To accomplish the objective, multiple grooves are formed in a hinge sleeve, a limit recess is defined on an inner face of the sleeve and at least one meander line recess and a flange corresponding to the limit recess are formed on a hinge shaft. After lubricant is added in both the grooves and the meander line recess and the shaft is inserted into the sleeve, the pivotal movement between the sleeve and the shaft is smoothed.

Other objects, advantages and novel features of the invention will become more apparent from the following detailed description when taken in conjunction with the accompanying drawings.

DETAILED DESCRIPTION OF PREFERRED EMBODIMENT

Figure 1:
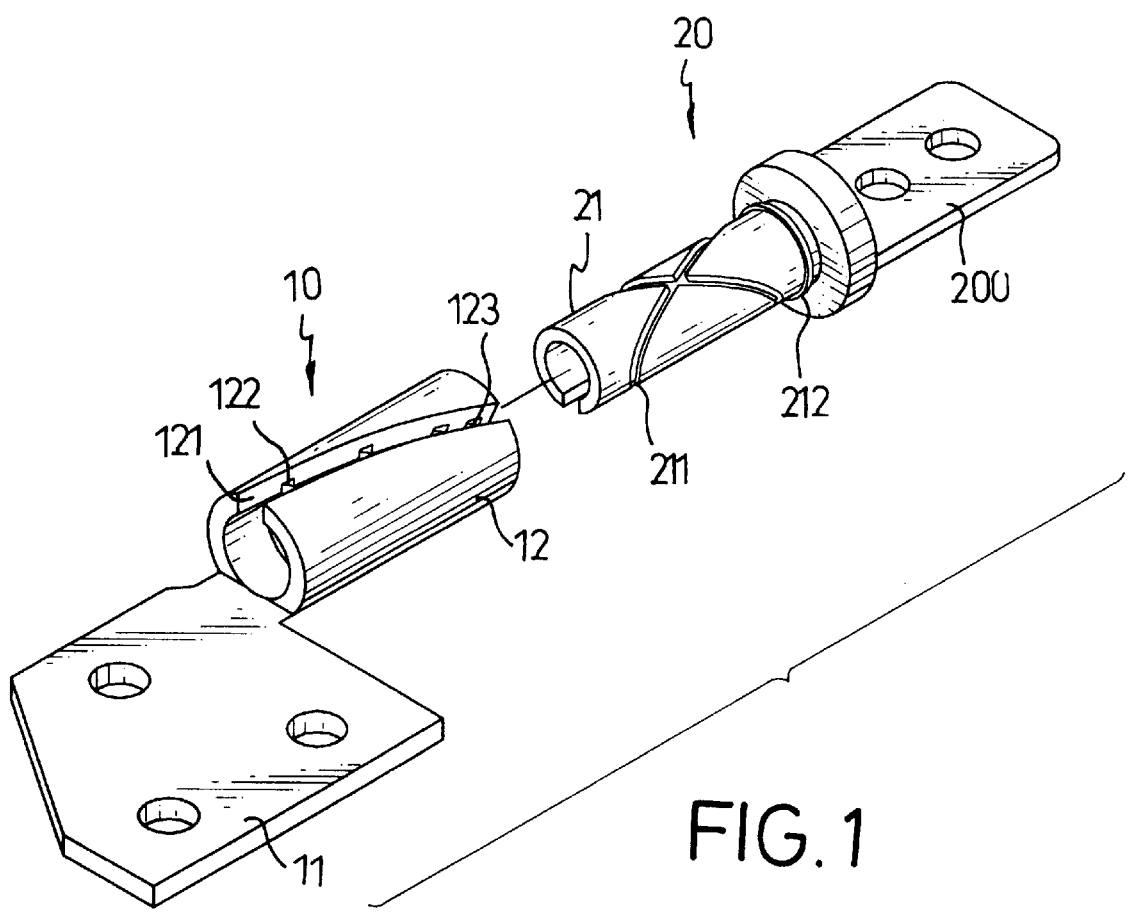
FIG. 1 is an exploded perspective view of the hinge in accordance with the present invention.
Figure 2A:
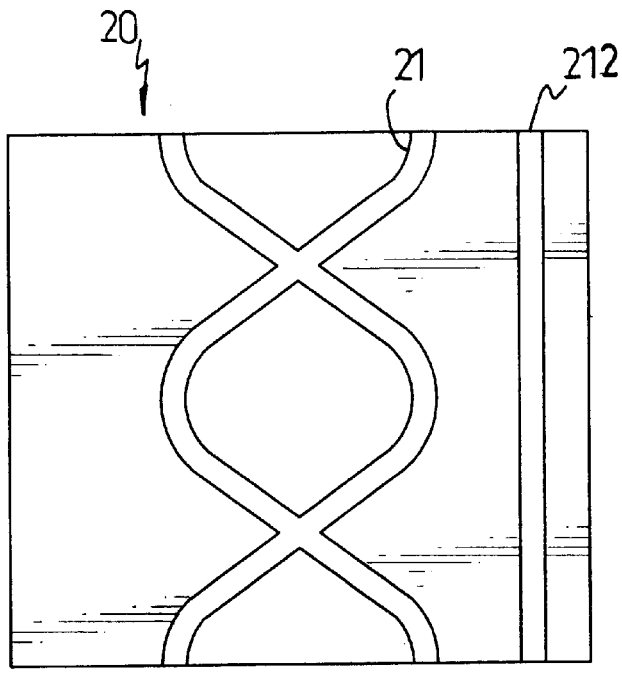
FIG. 2A is a planar projection of the surface of the shaft in FIG. 1.
Figure 2B:
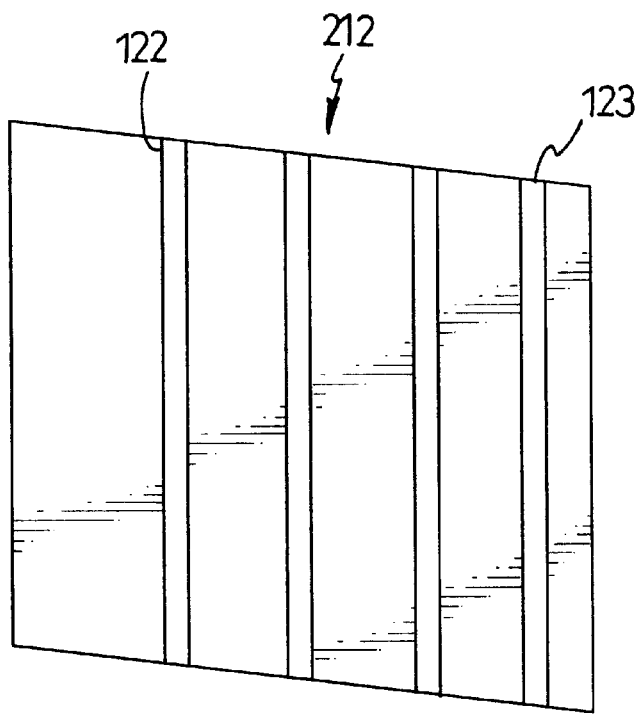
FIG. 2B is a planar projection of the interior surface of the sleeve in FIG. 1.
Figure 3A:
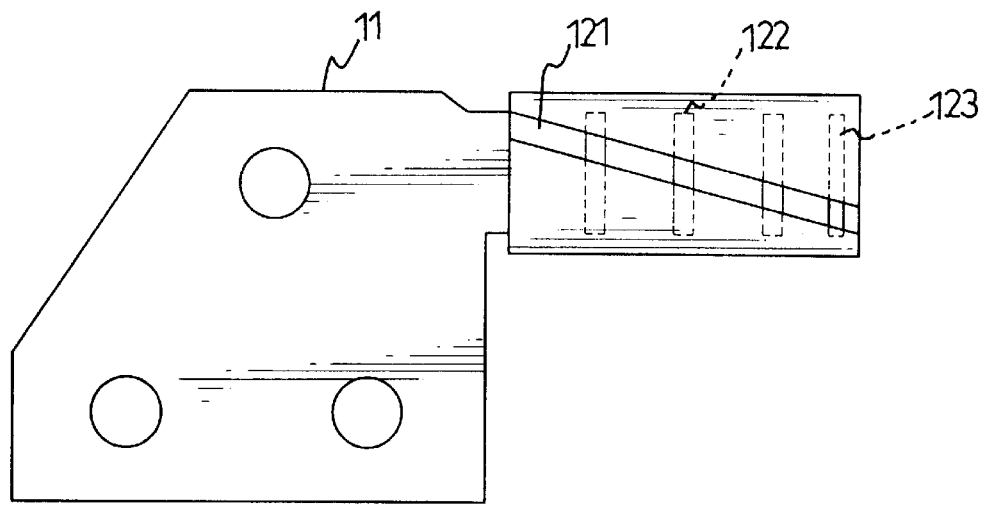
FIG. 3A is a top plan view of the sleeve in FIG. 1.
Figure 3B:
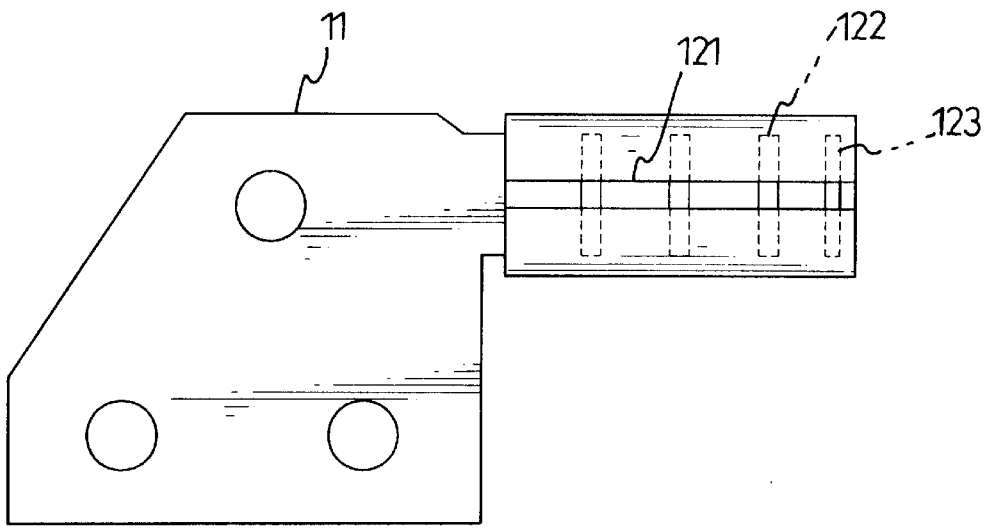
FIG. 3B is a top plan view of another embodiment of the sleeve in accordance with the present invention.

With reference to FIGS. 1, 2A, 2B, 3A and 3B, the hinge in accordance with the present invention has a sleeve (10) and a shaft (20) pivotally connected with the sleeve (10).

The sleeve (10) has a first connection plate (11) and a tubular portion (12). The first connection plate (11) is configured so that the first connection plate (11) is able to securely attach to the housing of the computer. The tubular portion (12) has an inner surface, an outer surface, a slit (121), grooves (122) and a receiving recess (123). The slit (121) is defined through the tubular portion (12). The grooves (122) and receiving recess (123) are defined in the inner surface of the tubular portion (12). Depending on the embodiment, the slit (121) is defined either longitudinal or inclined at a slight angle from longitudinal in the tubular portion (12).

The shaft (20) has a second connection plate (200), a journal (21) and a flange (212). The second connection plate (200) is configured to securely attach to the monitor of the computer. The journal (21) is integrally formed with the second connection plate (200), has an outer surface and has at least one meander-line recess (211) defined in the outer surface of the journal (21). The flange (212) is formed on the outer surface of the journal (21) to correspond to the receiving recess (123) in the tubular portion (12).

Figure 4:
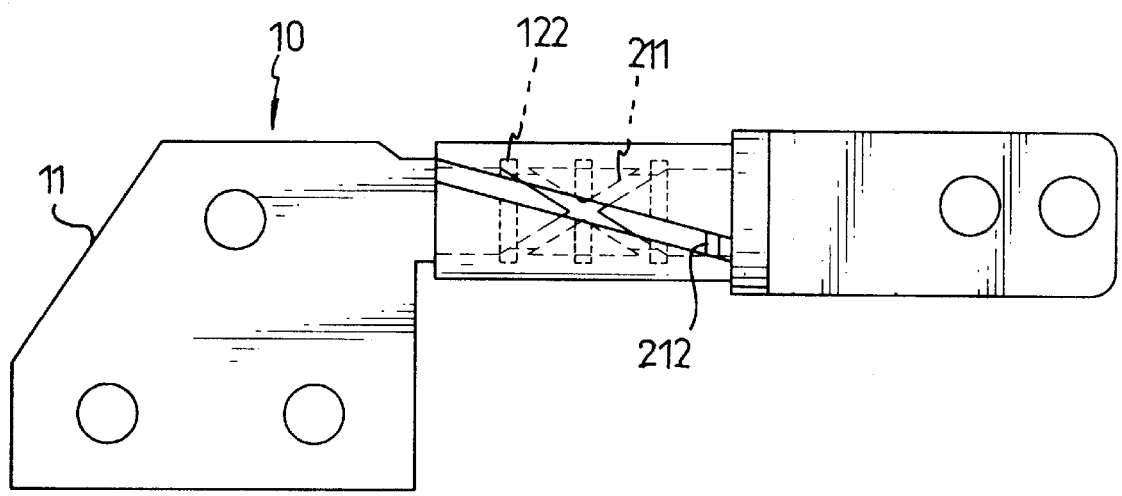
FIG. 4 is a top plan view of the hinge in FIG. 1.

With reference to FIGS. 1 and 4, when the sleeve (10) and the shaft (20) are assembled, the journal (21) is inserted into the tubular portion (12). The outer diameter of the journal (21) is slightly larger than the inner diameter of the tubular portion (12). Consequently, the insertion of the journal (21) into the tubular portion (12) will deform the tubular portion (12) whereby the tubular portion (12) and the journal (21) are in interference fit with each other. To further enhance the engagement between the tubular portion (12) and the journal (21), the flange (212) is seated in the receiving recess (123) such that the sleeve (10) and the shaft (20) cannot separate. After the journal (21) is inserted into the tubular portion (12), the meander-line recess (211) intersects with the grooves (122), which provides the necessary lubrication of the surfaces of the journal (21) and the inside surface of the tubular portion (12) to allow pivotal movement between the journal (21) and the tubular portion (12).

Figure 5:
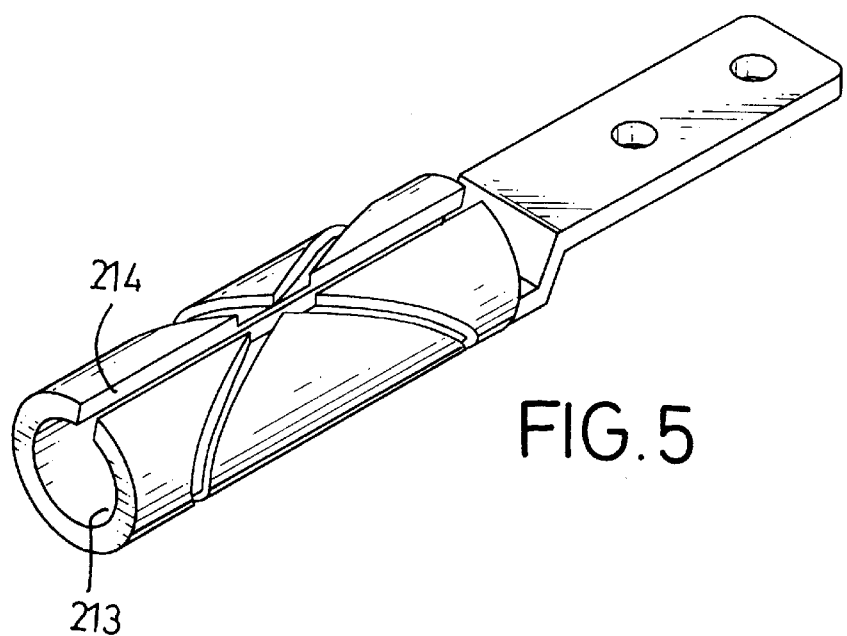
FIG. 5 is a perspective view of another embodiment of the shaft in accordance with the present invention.
Figure 6:
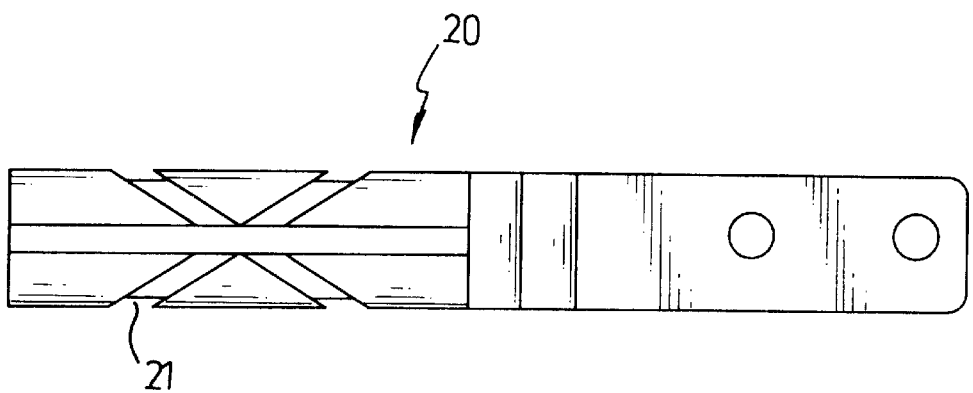
FIG. 6 is a top plan view of the shaft in FIG. 5.

With reference to FIGS. 5 and 6, another embodiment of the journal (21) in accordance with the present invention is tubular with an interior channel (213) and longitudinal shot (214) defined in the outside surface to communicate with the interior channel (213). The tubular construction of the journal (21) reduces the weight of the hinge and can still provide the required performance.

The hinge of the present invention is lightweight and has a simple structure so the cost is low and the space to store inventory is also small.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer hinge comprising:
   a sleeve having a first connection plate configured to attach to a computer housing and a tubular portion with an inside surface, an outside surface, a slit peripherally and longitudinally defined through the tubular portion, annular grooves and an annular receiving recess both defined in the inner surface of the tubular portion and axially spaced from each other; and a shaft having a second connection plate adapted to attach to a computer monitor, a journal having a first axial end integrally formed with the second connection plate and a second axial end, with the journal having an outer surface and at least one meander-line recess defined in the outer surface of the journal spaced from the first and second axial ends, with a flange formed on the outer surface of the journal adjacent to the first axial end to correspond to the annular receiving recess in the tubular portion, wherein the journal is pivotally received in the tubular portion and the at least one meander-line recess intersects with the annular grooves in the sleeve.

2. The computer hinge as claimed in claim 1, wherein the slit is inclined at a slight angle from longitudinal.

3. The computer hinge as claimed in claim 1, wherein the journal is tubular and has an interior channel.

4. The computer hinge as claimed in claim 2, wherein the journal is tubular and has an interior channel.

5. The computer hinge as claimed in claim 3, wherein the journal further defines a longitudinal slot communicating with the channel.

6. The computer hinge as claimed in claim 4, wherein the journal further defines a longitudinal slot communicating with the channel.

7. The computer hinge as claimed in claim 6, with the journal and the second connection plate being formed by stamping and rolling a single piece of flat stock.

8. The computer hinge as claimed in claim 7, with the journal further including another meander-line recess intersecting with the at least one meander-line recess.

9. The computer hinge as claimed in claim 5, with the journal and the second connection plate being formed by stamping and rolling a single piece of flat stock.

10. The computer hinge as claimed in claim 9, with the journal further including another meander-line recess intersecting with the at least one meander-line recess.

11. The computer hinge as claimed in claim 2, with the journal further including another meander-line recess intersecting with the at least one meander-line recess.

12. The computer hinge as claimed in claim 1, with the journal further including another meander-line recess intersecting with the at least one meander-line recess.

* * * * *